United States Patent [19]

Claus et al.

[11] Patent Number: 5,310,999

[45] Date of Patent: May 10, 1994

[54] SECURE TOLL COLLECTION SYSTEM FOR MOVING VEHICLES

[75] Inventors: David M. Claus; Kevin D. Murphy, both of Indianapolis; Marjorie E. Taylor, Carmel, all of Ind.

[73] Assignee: AT&T Bell Laboratories, Murray Hill, N.J.

[21] Appl. No.: 908,195

[22] Filed: Jul. 2, 1992

[51] Int. Cl.⁵ ............................................. G07B 15/02
[52] U.S. Cl. ...................................... 235/384; 380/23; 380/29
[58] Field of Search ................... 342/44, 456; 235/384; 380/23, 29

[56] References Cited

U.S. PATENT DOCUMENTS

| | | | |
|---|---|---|---|
| 3,602,881 | 8/1971 | Bayne et al. | 340/928 |
| 4,303,904 | 12/1981 | Chasek | 340/23 |
| 4,338,587 | 7/1982 | Chiappetti | 340/32 |
| 4,471,216 | 9/1984 | Herve | 235/380 |
| 4,549,075 | 10/1985 | Saada et al. | 235/380 |
| 4,555,618 | 11/1985 | Riskin | 235/384 |
| 4,791,283 | 12/1988 | Burkhardt | 235/438 |
| 4,795,898 | 1/1989 | Bernstein et al. | 235/487 |
| 4,798,322 | 1/1989 | Bernstein et al. | 235/487 |
| 4,849,615 | 7/1989 | Mollet | 235/492 |
| 4,870,419 | 9/1989 | Baldwin et al. | 342/50 |
| 4,870,604 | 9/1989 | Tatsuno | 235/380 |
| 4,899,036 | 2/1990 | McCrindle et al. | 235/492 |
| 4,963,723 | 10/1990 | Masada | 235/384 |
| 4,963,887 | 10/1990 | Kawashima et al. | 342/44 |
| 4,977,501 | 12/1990 | Lefevre | 364/401 |
| 5,086,389 | 2/1992 | Hassett et al. | 364/401 |
| 5,109,152 | 4/1992 | Takagi et al. | 235/380 |
| 5,144,553 | 9/1992 | Hassett et al. | 364/401 |
| 5,163,098 | 11/1992 | Dahbura | 380/24 |
| 5,193,114 | 3/1993 | Moseley | 380/23 |

FOREIGN PATENT DOCUMENTS 2247096 2/1992 United Kingdom ............... 235/375

OTHER PUBLICATIONS

Federal Information Processing Standards Publication 46, Jan. 15, 1977, Specifications for the Data Encryption Standard.

Primary Examiner—Donald Hajec
Assistant Examiner—Adrian Young
Attorney, Agent, or Firm—Michael A. Morra

[57] ABSTRACT

A secure toll payment system is realized by transmitting a changeable encryption code from roadside equipment at a toll plaza to a moving vehicle. Thereafter, the moving vehicle uses it to encrypt payment information according to the Data Encryption Standard algorithm. The moving vehicle transmits the encrypted payment information to the roadside equipment which performs a credit or debit transaction. Because the encryption code changes from time to time, so too does the nature of the signal which is transmitted by the vehicle; and fraud, based on electronic eavesdropping, is substantially eliminated. The encryption code comprises an 8-bit random number and a time/date number. Vehicle-mounted apparatus includes a transponder unit and a portable smart card which inserts therein. The roadside equipment includes a pair of spaced-apart antennas that are sequentially located along an express payment lane at a toll plaza and a computer (Plaza Server) which controls them.

20 Claims, 10 Drawing Sheets

| TRANSPONDER DATA FRAME (128 BITS) | | |
|---|---|---|
| FIXED DATA FRAME (40 BITS) | VARIABLE DATA FRAME (72 BITS) | CRC (16 BITS) |

FIG. 10

| FIXED DATA FRAME (40 BITS) | | | |
|---|---|---|---|
| BITS | DESCRIPTION | LENGTH | VALUE (HEX) |
| 1 - 8 | HEADER | 8 BITS | FFh |
| 9 - 12 | TRANSPONDER TYPE | 4 BITS | 3 |
| 13 - 16 | VEHICLE CLASS | 4 BITS | 01h |
| 17 - 40 | SMART CARD ID | 24 BITS | FROM USER CARD |

FIG. 11

| ACTIVATION MODE VARIABLE DATA FRAME (72 BITS) -- VEHICLE TO RSR | | | | | |
|---|---|---|---|---|---|
| BITS | DESCRIPTION | LENGTH | WRITTEN BY | READ BY | ENCRYPTED |
| 1 | GREY LIST BIT | 1 BIT | ----- | ----- | NO |
| 2 | PROGRAM CHECK | 1 BIT | RSR | NA | NO |
| 3 - 8 | NOT ASSIGNED | 6 BITS | NA | NA | NO |
| 9 - 24 | TIME/DATE (ENTRANCE) | 16 BITS | RSR* | RSR | NO |
| 25 - 32 | LOCATION (ENTRANCE) | 8 BITS | RSR* | RSR | NO |
| 33 - 48 | $ BALANCE | 16 BITS | VEHICLE | RSR | NO |
| 49 | BLACK LIST BIT | 1 BIT | ----- | ----- | NO |
| 50 | DEBIT/CREDIT | 1 BIT | ----- | ----- | NO |
| 51 - 64 | TRANSACTION AMOUNT | 14 BITS | ----- | ----- | NO |
| 65 - 72 | "RANDOM" NUMBER | 8 BITS | ----- | ----- | NO |

*(WRITTEN BY RSR AT ENTRANCE LOCATION)

FIG. 12

| ACTIVATION MODE VARIABLE DATA FRAME (72 BITS) -- RSR TO VEHICLE | | | | | |
|---|---|---|---|---|---|
| BITS | DESCRIPTION | LENGTH | WRITTEN BY | READ BY | ENCRYPTED |
| 1 | GREY LIST BIT | 1 BIT | ----- | ----- | NO |
| 2 | PROGRAM CHECK | 1 BIT | RSR | NA | NO |
| 3 - 8 | NOT ASSIGNED | 6 BITS | NA | NA | NO |
| 9 - 24 | TIME/DATE | 16 BITS | RSR | VEHICLE | NO |
| 25 - 32 | LOCATION (ENTRANCE) | 8 BITS | ----- | ----- | NO |
| 33 - 48 | $ BALANCE | 16 BITS | ----- | ----- | NO |
| 49 | BLACK LIST BIT | 1 BIT | ----- | ----- | NO |
| 50 | DEBIT/CREDIT | 1 BIT | ----- | ----- | NO |
| 51 - 64 | TRANSACTION AMOUNT | 14 BITS | ----- | ----- | NO |
| 65 - 72 | "RANDOM" NUMBER | 8 BITS | RSR | VEHICLE | NO |

FIG. 13

| TRANSACTION MODE VARIABLE DATA FRAME (72 BITS) -- VEHICLE TO RSR | | | | | |
|---|---|---|---|---|---|
| BITS | DESCRIPTION | LENGTH | WRITTEN BY | READ BY | ENCRYPTED |
| 1 | GREY LIST BIT | 1 BIT | ----- | ----- | NO |
| 2 | PROGRAM CHECK (TRIAL) | 1 BIT | RSR | NA | NO |
| 3 - 8 | NOT ASSIGNED | 6 BITS | NA | NA | NO |
| 9 - 24 | TIME/DATE (ENTRANCE) | 16 BITS | RSR* | RSR | YES |
| 25 - 32 | LOCATION (ENTRANCE) | 8 BITS | RSR* | RSR | YES |
| 33 - 48 | $ BALANCE | 16 BITS | VEHICLE | RSR | YES |
| 49 | BLACK LIST BIT | 1 BIT | ----- | ----- | YES |
| 50 | DEBIT/CREDIT | 1 BIT | ----- | ----- | YES |
| 51 - 64 | TRANSACTION AMOUNT | 14 BITS | ----- | ----- | YES |
| 65 - 72 | "RANDOM" NUMBER | 8 BITS | VEHICLE | RSR | YES |

*(WRITTEN BY RSR AT ENTRANCE LOCATION)

FIG. 14

| TRANSACTION MODE VARIABLE DATA FRAME (72 BITS) -- RSR TO VEHICLE | | | | | |
|---|---|---|---|---|---|
| BITS | DESCRIPTION | LENGTH | WRITTEN BY | READ BY | ENCRYPTED |
| 1 | GREY LIST BIT | 1 BIT | RSR | VEHICLE | NO |
| 2 | PROGRAM CHECK | 1 BIT | RSR | NA | NO |
| 3 - 8 | NOT ASSIGNED | 6 BITS | NA | NA | NO |
| 9 - 24 | PRESENT TIME/DATE | 16 BITS | RSR | VEHICLE | YES |
| 25 - 32 | PRESENT LOCATION | 8 BITS | RSR | VEHICLE | YES |
| 33 - 48 | $ BALANCE (REPEAT) | 16 BITS | RSR | VEHICLE | YES |
| 49 | BLACK LIST BIT | 1 BIT | RSR | VEHICLE | YES |
| 50 | DEBIT/CREDIT | 1 BIT | RSR | VEHICLE | YES |
| 51 - 64 | TRANSACTION AMOUNT | 14 BITS | RSR | VEHICLE | YES |
| 65 - 72 | "RANDOM" NUMBER | 8 BITS | RSR | VEHICLE | YES |

SECURE TOLL COLLECTION SYSTEM FOR MOVING VEHICLES

TECHNICAL FIELD

This invention relates to automatic payment systems in general, and more particularly to electronic toll collection for moving vehicles.

BACKGROUND OF THE INVENTION

Unless a willingness exists to embrace mass transportation and, thus, decrease the use of personal automobiles, traffic delays will be a growing and unfortunate fact of life. Ultimately, mass transportation systems will become a more significant part of everyday travel due to population growth and the costs (personal and environmental) associated with highways packed with automobiles-each carrying one person. One of the costs comes in the form of highway congestion and the anguish that accompanies long traffic delays. However, until more convenient and cost-competitive, mass transportation systems become available, it is desirable to improve the highway congestion problem, and nowhere is it worse than around toll booths.

The use of toll booths on highways is viewed as a mixed blessing by motorists. Most will agree that safe, high-speed, well-maintained highways are vital to the quality of their life; that such highways are expensive; and that toll booths provide an equitable way to pay for them. On the other hand, most will agree that stopping in order to pick up a ticket and/or make a payment is an annoyance, particularly during peak traffic periods when toll payment queues exceed several minutes. The fuel wasted and pollution created, while waiting in a queue, is significant when large numbers of automobiles are involved. Considering the many conveniences available in present day automobiles and the generally high quality of toll roads, the annoyance displayed by motorists when encountering a traffic delay is somewhat surprising. Nevertheless, the desire for increased transit speed appears insatiable.

U.S. Pat. No. 4,338,587 discloses a vehicle toll collection system that automatically identifies vehicles in an "express" lane. In order to benefit from the express lane, vehicles are equipped with radio frequency transmitters that send data to electronic toll collecting apparatus to identify the vehicle using information such as the state of registration and license number. Tolls are billed to the vehicle owner's account, and payment is disbursed by an agency that both issues license plates and collects toll payments (in advance) from the vehicle owner. Although this technique is useful, it requires a great deal of administrative overhead and is susceptible to fraud. For example, the transmission of incorrect information (the license number of another vehicle) is not detected until the next time the owner of the other vehicle is billed.

U.S. Pat. No. 4,963,723 discloses an automatic toll collector for toll roads which requires the driver of a vehicle to insert an integrated circuit (IC) card into each toll booth. The IC card stores both license and bank account information. Tolls are withdrawn from the card holder's bank account, and means are provided for comparing the license information with the actual license plate which is acquired as the vehicle passes through the toll booth. However, this system offers little or no improvement in the speed of toll collection since the driver is required to stop. But even if the information on the IC card were electronically transmitted to the toll booth, the improved security against fraud comes at great inconvenience to both the card holder and the highway authority. Card holders should be able to pay the toll for any vehicle that they happen to be in (a friend's car, a rental car, etc.), not just specific vehicles; and additional equipment is needed to read each license plate. The latter is not only a significant technical challenge but also requires cooperation among various states regarding license design if out-of-state drivers are to benefit from such a system.

One popular technique for making high speed toll payments is through the use of a miniature transponder that attaches to the windshield of a vehicle and broadcasts an identification signal when it enters an electromagnetic field having predetermined characteristics. Because such transponders operate at radio frequencies, they have become known as RF-tags. Unfortunately, electronic eavesdropping is relatively easy in such a system; the transmitted identification signal can be intercepted, recorded, and rebroadcast by another vehicle to avoid toll payments. It appears to be a fact of life that when theft is too easy to accomplish, even the most honest people indulge; and when theft requires great effort, even scoundrels behave.

In systems where payments are made by the transfer of data, care must be taken to assure that the data represents an accurate indication of the purported information. Tampering with the device containing the data can produce various undesirable results that comprise the integrity of the data and thereby defeat the payment scheme. For example, if the account number on a credit card is altered, then the transaction is charged to the wrong person; and if the cash balance on a debit card is increased in an unauthorized manner, then the creditor is defrauded. It is therefore desirable to provide a secure toll collection scheme for moving vehicles.

SUMMARY OF THE INVENTION

In accordance with the invention, secure toll payment is accomplished by transmitting a changeable verification number to a moving vehicle. Thereafter, the moving vehicle uses the verification number to encrypt the verification number according to a predetermined algorithm and then broadcasts the resulting signal. Because the verification number changes from time to time, so too does the nature of the signal which is broadcast by the vehicle; and fraud, based on electronic eavesdropping, is substantially eliminated.

In an illustrative embodiment of the invention, the verification number comprises an 8-bit number and a time/data number. A smart card is inserted into a vehicle-mounted transponder unit, but is easily removed and carried by the v hicle owner. Being no larger than a conventional credit card, the smart card can be carried in the owner's wallet. Approximately one-half second is allocated to the smart card and transponder unit for processing, and a pair of spaced-apart antennas are sequentially positioned in an express payment lane at a toll plaza to accommodate vehicles moving at high speed.

In the illustrative embodiment, a debit card is locked during the debit process, and unlocked when it is successfully completed. This prevents fraud by those who would remove the card from the transponder during the debit process in order to avoid making payment.

Security is further improved by use of the Data Encryption Standard (DES) algorithm, stored in the smart card's memory, to encrypt the encryption code into ciphertext. DES has the advantage that it is well known and documented. It is a private key system that is highly secure as long as the private key is kept secret. DES has the further advantage that its ciphertext output is reversible—i.e., ciphertext C can be decrypted back into the original message M using the same private key.

BRIEF DESCRIPTION OF THE DRAWING

The invention and its mode of operation will be more clearly understood from the following detailed description when read with the appended drawing in which.

DETAILED DESCRIPTION

Briefly, the present invention resides in a system that allows vehicles to pass through specially designed toll booths at relatively high speeds-at least as high as safety considerations allow. As motorists approach the toll booth, they insert a smart card into a transponder unit which reads identification information stored on the card and transmits it, via radio frequency, to a roadside reader (RSR) which comprises a pair of spaced-apart antennas and a computer (Plaza Server) which serves the toll booth in matters of electronic toll payment. In response, the RSR either debits the card or charges the toll to the motorist's account. The details of this transaction are then transmitted from the roadside controller back to the transponder, and a record is written into the smart card. This system is implemented in such a way that it operates with fixed or variable payment toll booths. Further, techniques are disclosed that prevent fraud while providing maximum convenience to both the motorist and the highway authority. These benefits will become apparent as the details of implementation are revealed.

Figure 1:
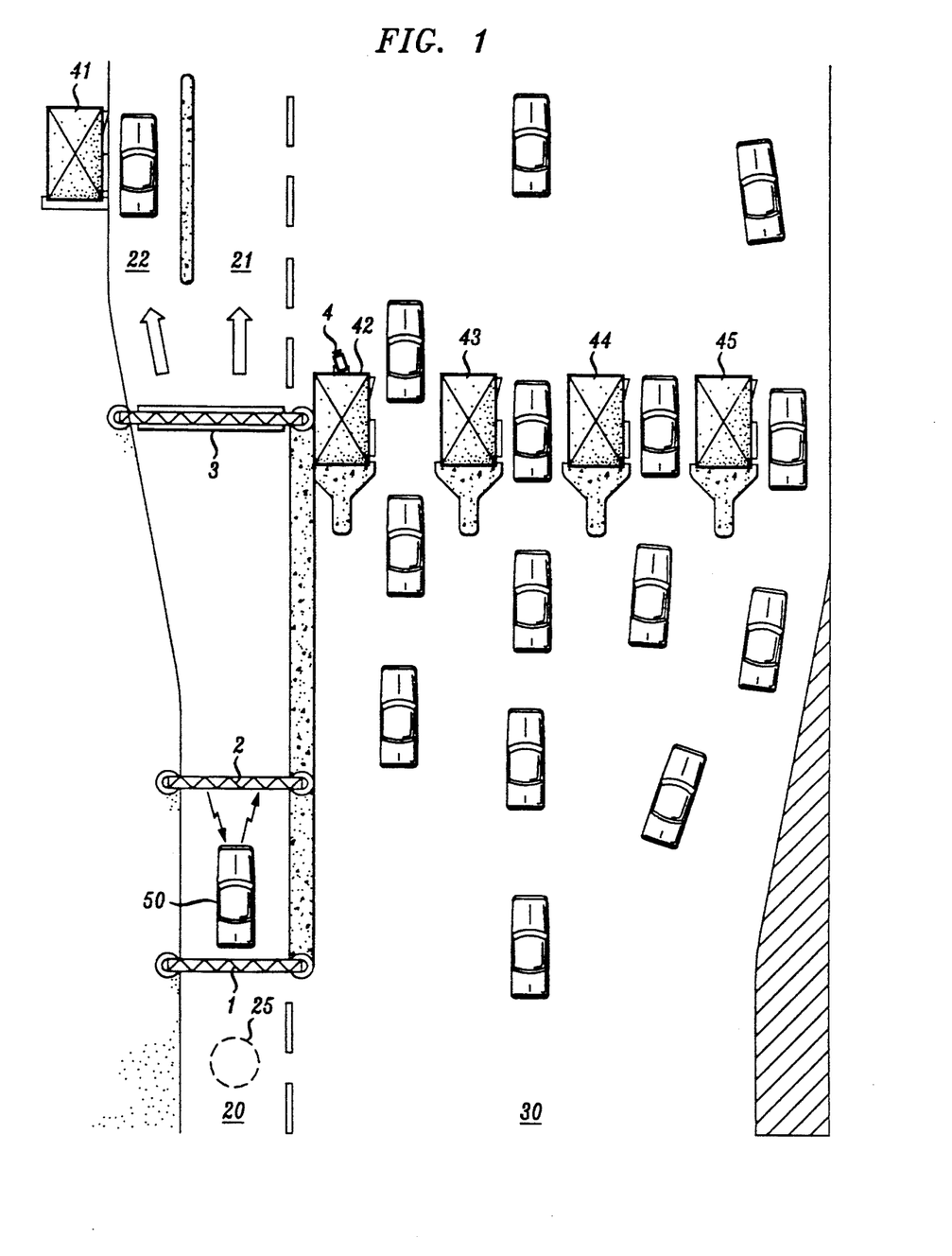
FIG. 1 is a bird's eye view of a highway toll plaza that includes an express lane for toll collection using a two-antenna system in accordance with the invention.

FIG. 1 discloses a bird's eye view of a toll payment area which uses the toll collection system of the present invention. The toll payment area comprises an enlarged portion of highway and a number of toll collection booths 41-45. Such toll booths may be located at the entrance of a limited access highway, bridge or tunnel where fixed amounts of money are collected for the privilege of using that particular facility, or where tickets are given to each vehicle that indicate the location where it entered the highway. Such toll booths may also be located at the exit of a limited access highway where they are used for the collection of variable tolls. There, tickets are collected (to avoid possible fraudulent use later) and payment is determined by the particular entrance where the vehicle entered the highway. The present invention is suitable for use in all of these situations.

The enlarged portion of highway includes lane 30 which is used by motorists who wish to use cash or tokens in making toll payments. Unfortunately, making such payments requires that vehicles come to a complete stop, and frequently they must wait until others have completed their payment before beginning their own transaction at one of the toll booths 42-45. The enlarged portion of highway also includes express lane 20 which is used by motorists who are equipped to make electronic payment without stopping. Prior to entering lane 20, however, the motorist inserts a payment card into a transponder unit that mounts on the windshield (see FIG. 4) or dashboard of vehicle 50. Information from the card is loaded into the transponder which awaits an activation signal from antenna 1. The activation signal is triggered when a vehicle drives over a loop sensor 25 which, illustratively, is embedded in the roadway just prior to reaching antenna 1. Alternatively, antenna 1 continuously broadcasts an activation signal. In either scenario, the activation signal triggers an information exchange between the transponder and antenna 1. Further along lane 20, antenna 2 is positioned to exchange additional information with the transponder unit in vehicle 50. These antennas are spaced apart to provide a time interval (approximately 500 milliseconds) which is used for processing the information received from antenna 1 before exchanging additional information with antenna 2. The results of these exchanges are displayed on message display 3 (illustratively, an overhead sign) under control of a Lane Controller which tells the motorist either to continue ahead in lane 21, or to pull over into lane 22 where toll booth 41 is located. Motorists would be asked to pull over, for example, when there are insufficient funds within the card (when debit cards are used), when the card has been reported as being lost or stolen, when data transmission errors are detected, etc. At toll booth 41, motorists can purchase debit cards, make cash payment (usually because they have inadvertently entered express lane 20), or increase the money balance on their existing debit card. A video camera 4 is positioned to photograph the license plates of vehicles that do not make the proper payment, possess a lost/stolen debit card, or are driving a vehicle that does not correspond to the vehicle class information stored in the debit card.

Figure 2:
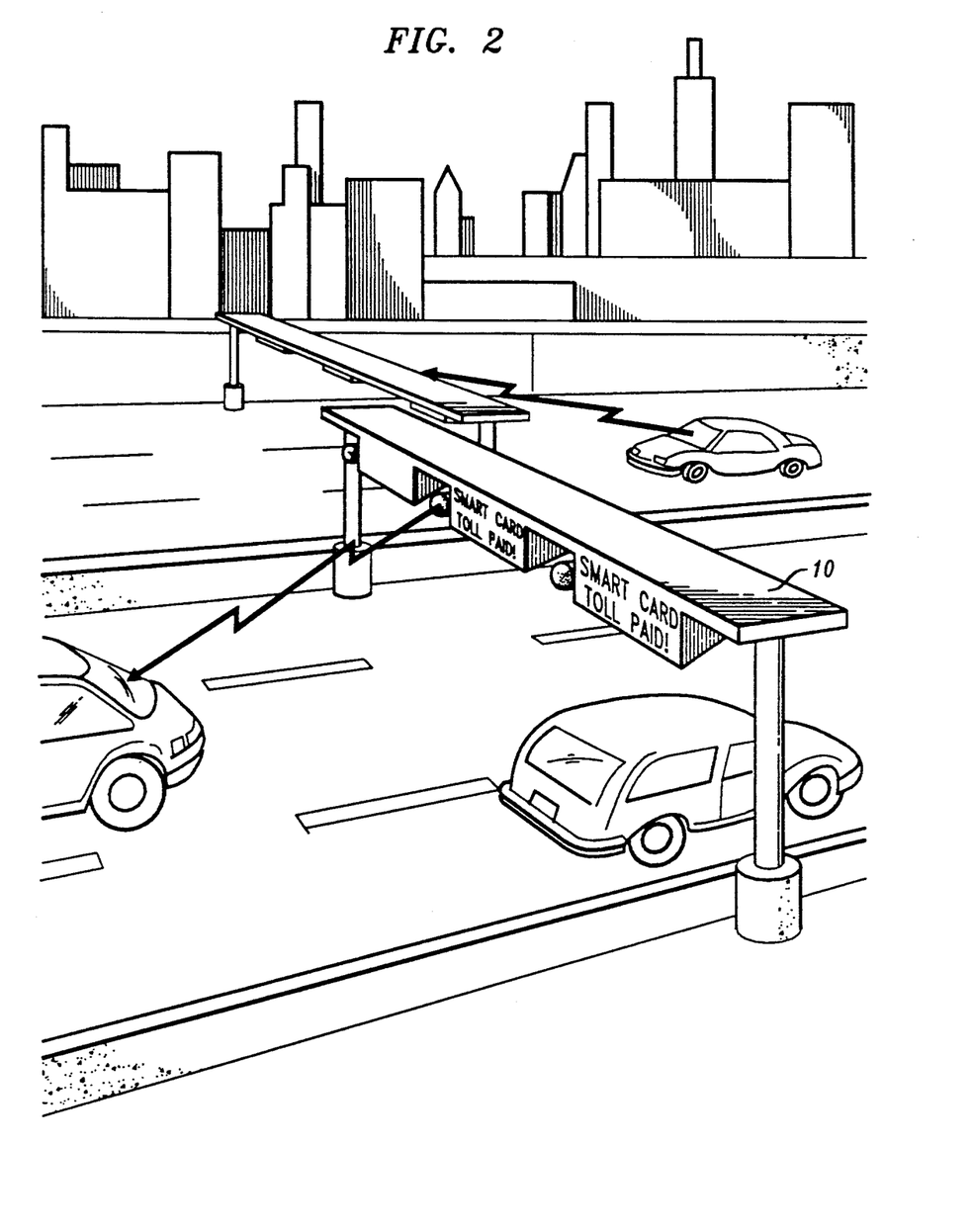
FIG. 2 illustrates a futuristic high speed toll collection system in accordance with the invention.

FIG. 2 illustrates a futuristic view of a multi-lane system for the rapid payment of tolls. It is noted that a single structure 10 combines the functions of antennas 1, 2 and display 3 shown in FIG. 1. The multiple data exchanges between the transponder in the vehicle and structure 10 can occur at data processing speeds which permit the use of a single antenna—such as shown. The cost associated with higher data processing speeds suggests that it is more cost effective, at the present time, to use a pair of spaced-apart antennas. Nevertheless, the present invention is adaptable to a single antenna system.

EQUIPMENT

Figure 3:
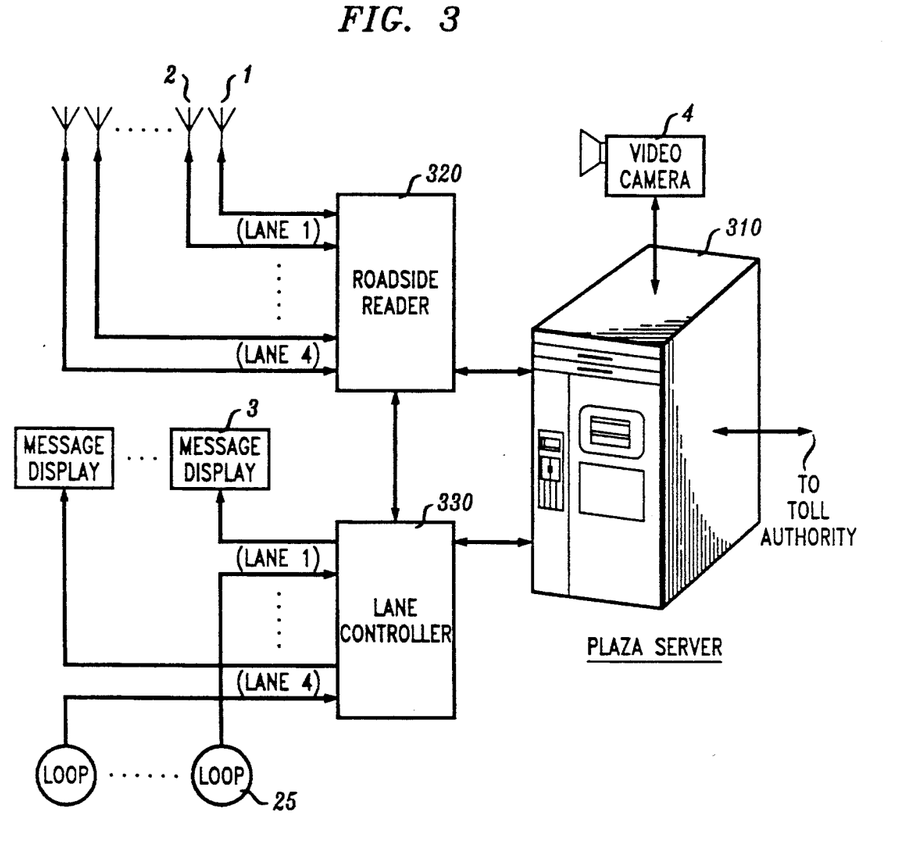
FIG. 3 discloses a block diagram of the equipment located at a toll plaza for collecting payments in accordance with the invention.

Elements of the preferred embodiment are shown in FIG. 3 which illustrates the various items used for providing rapid toll collection in a multi-lane system. Plaza Server 310 is, illustratively, an AT&T/NCR (3400 Class) computer which communicates with a Toll Authority host computer, via telephone lines (9.6–56 Kb/s), and with the equipment that monitors and serves a number of high speed payment lanes. Roadside Reader (RSR) 320 and Lane Controller (LC) 330 each handle up to four lanes under control of the Plaza Server 310. Although additional RSRs and LCs may be connected to the Server, only one of each is shown for the sake of clarifying the invention. Similarly, only the apparatus needed to handle a single high speed lane is shown. Loop 25 senses an oncoming vehicle in a particular high speed payment lane and delivers this information to Server 310 via LC 330. Antenna 1 then transmits an activation signal to the oncoming vehicle under control of RSR 320. In the illustrative embodiment, RSR 320 comprises the equipment needed for modulating-/demodulating signals in the radio frequency (RF) range from 902 to 928 MHz in order to adapt data signals for transmission through the air. A pair of antennas serve each lane. After the vehicle passes these antennas, the results of the data exchange between the vehicle transponder and the antennas are visually communicated to the motorist in the vehicle by means of message display 3 which is driven by LC 330 under control of Server 310 which provides one of a plurality of different messages. Plaza Server 310 also controls a video camera 4 which is generally used to record the identity of vehicles that do not make proper payment.

Figure 4:
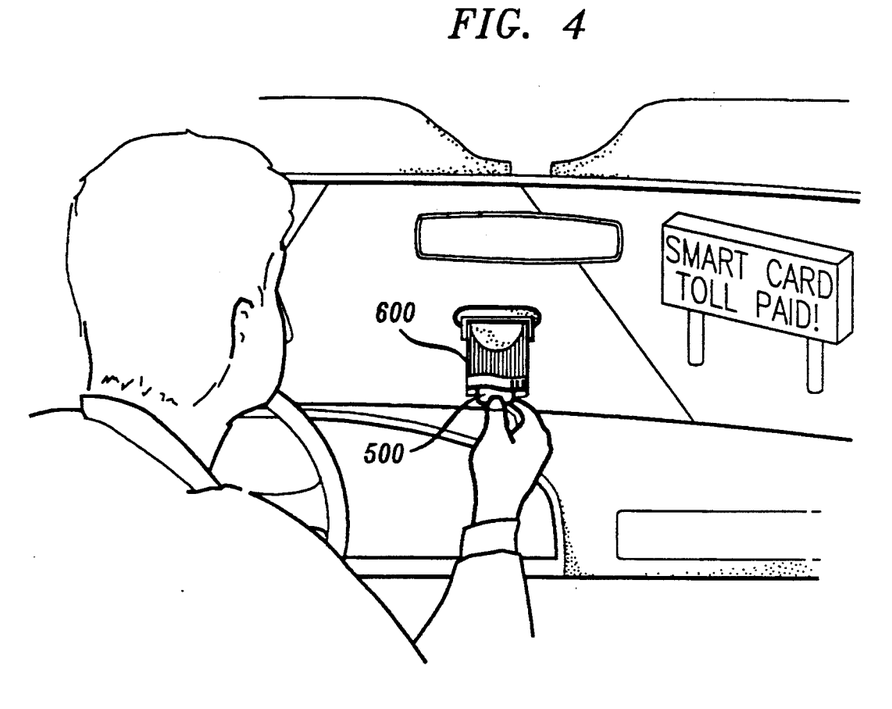
FIG. 4 shows a transponder mounted on the interior windshield of a vehicle and a motorist inserting/removing the smart card.
Figure 5:
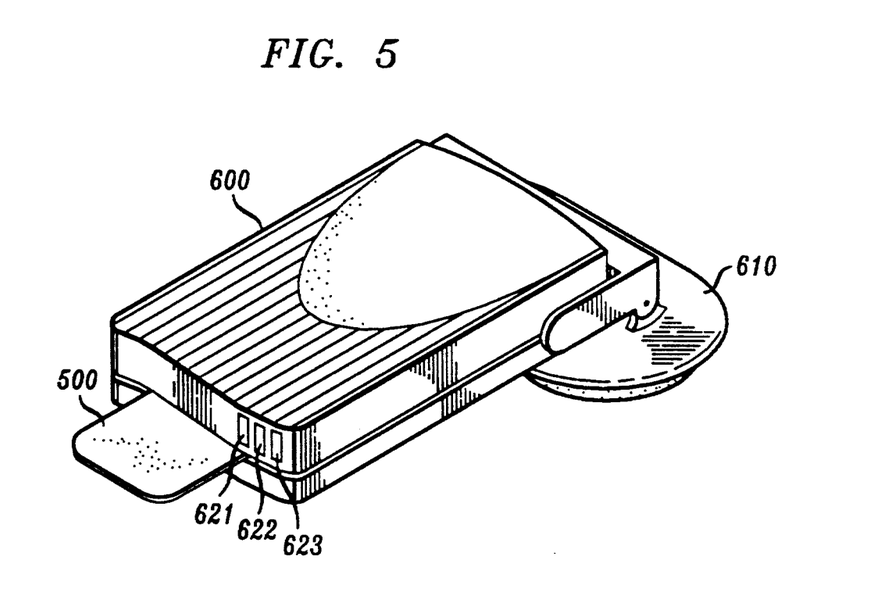
FIG. 5 shows a transponder with a smart card inserted therein such as used in the present invention.
Figure 6:
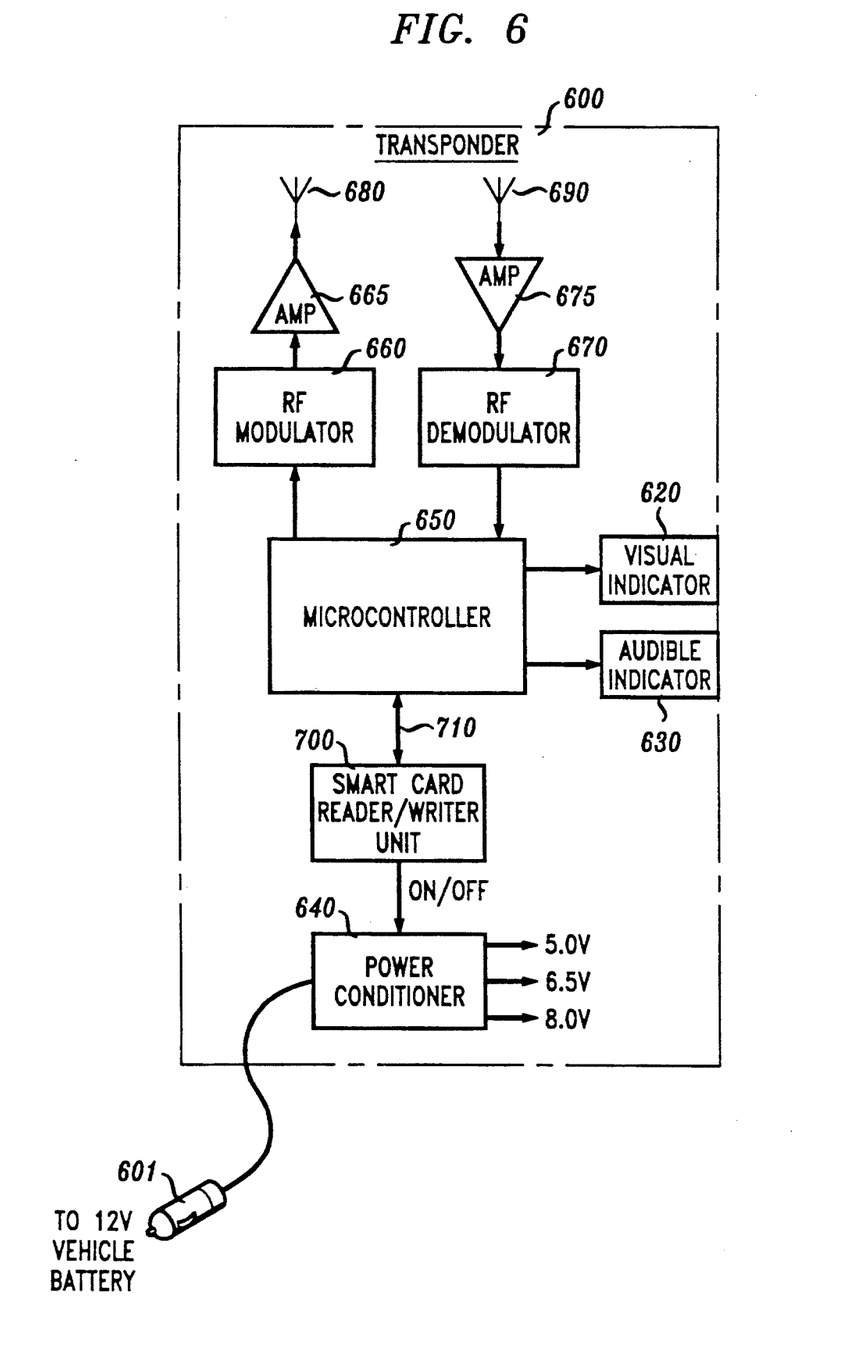
FIG. 6 discloses a block diagram of the transponder used in the present invention.

FIG. 5 illustrates the appearance of the transponder 600—a vehicle-mounted unit which communicates with antennas 1 and 2 to make toll payments and transfer data to/from smart card 500 which is inserted therein. Transponder 600 attaches to the dashboard or windshield (see FIG. 4) of the vehicle via mounting apparatus 610 which rotates to accommodate various mounting positions. The front front surface of the transponder includes a slot for receiving the smart card, and lights 621, 622, 623 for providing visual indications to the motorist. A block diagram of the interior of transponder 600 is shown in FIG. 6. When a smart card is inserted into reader/writer unit 700, a switch is operated which causes power to be applied to the transponder. The transponder may be battery powered although the temperature range that the battery must endure is formidable. In the preferred embodiment of the invention, primary power is supplied to the transponder through plug 601 which connects to the vehicle battery (12 volts) via a cigarette lighter receptacle. Power conditioner 640 converts the 12 volt input power into output power at 5.0, 6.5 and 8.0 volts. Microcontroller 650 (illustratively an Intel 87C51FC 8-bit microprocessor) includes memory (ROM and RAM) which stores operating instructions for controlling the operation of the transponder. Microcontroller 650 controls visual indicator 620 which comprises LEDs 621, 622, 623 (see FIG. 5), and audible indicator 630 which comprises a piezoelectric transducer plus associated oscillators and timers. Microcontroller 650 transmits digital data to RF modulator 670 which has a nominal carrier frequency of 915 MHz. The modulated RF signal is amplified by amplifier 665 and delivered to transmitting antenna 680. Antenna 690 receives RF signals from the equipment shown in FIG. 3. These RF signals are amplified by amplifier 675, demodulated by RF demodulator 670 and the resulting data is delivered to microcontroller 650. Certain data is intended for the smart card, either for processing or for storage in the smart card's memory; and this data is delivered to reader/writer unit 700 over serial data bus 710.

Smart Card

Figure 7:
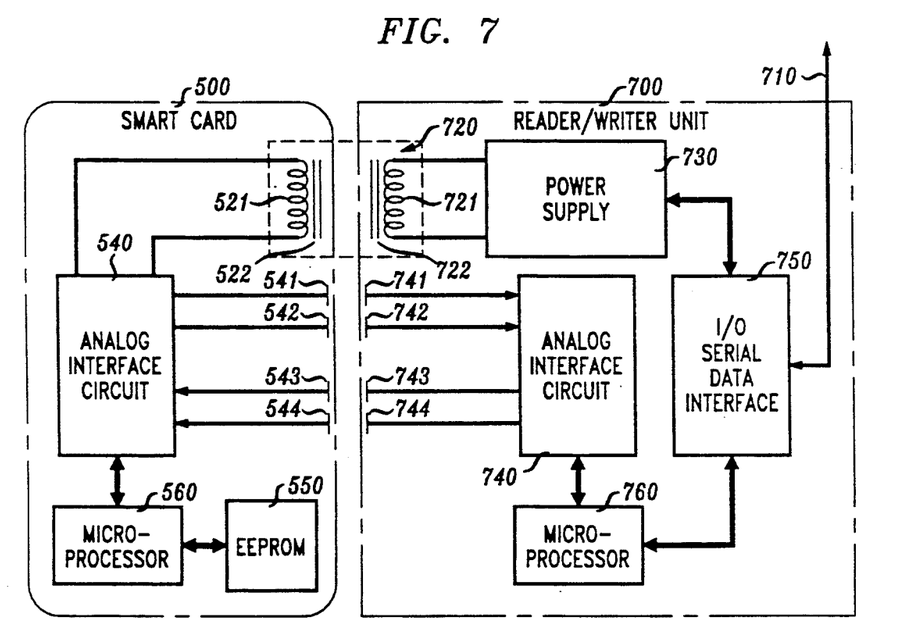
FIG. 7 is a block diagram of the major functional components of a smart card interconnected to a reader/writer unit and their general interconnection with each other.

Referring now to FIG. 7 there is disclosed a block diagram of a smart card 500 and a reader/writer unit 700 such as used in connection with the present invention. Although disclosed in greater detail in U.S. Pat. Nos. 4,797,898 and 4,798,322, a brief description is presented here. Some of the principal components located on smart card 500 are microprocessor 560, electrically erasable programmable read-only memory (EEPROM) 550, analog interface circuit 540, secondary winding 521 of transformer 920, and capacitive plates 541-544.

Microprocessor 560 includes a central processing unit and memory means in the form of random access memory and read-only memory. A microprocessor available from Intel Corporation such as Part No. 80C51 may be used with the proper programming. Operating under filmware control provided by its internal read-only memory, the microprocessor 560 formats data to the EEPROM 550 and to the reader/writer unit 700 via the analog interface circuit 540. EEPROMS are available from a number of suppliers. Data may be written to or used from an EEPROM repeatedly while operating power is being applied. When operating power is removed, any changes made to the data in the EEPROM remain and are retrievable whenever the smart card 500 is again powered.

The analog interface circuit 540 provides a means for interfacing smart card 500 with reader/writer unit 900. Within analog interface 540 are circuits responsive to capacitors 541-544, for exchanging data with reader/-writer unit 900. Power for operating the card 500 is provided to the analog interface circuit 540 via inductive transfer, received by the secondary winding 521 of transformer 720. This transformer is formed when secondary winding 521 is coupled to a primary winding 721 within the reader/writer unit 700. The transformer 720 may advantageously include a ferrite core 722 in the reader/writer for increased coupling between the transformer primary winding 721 and secondary winding 521. A second such core 522 may also be included within the smart card portion of transformer 720 to further increase coupling efficiency. The primary winding 721 is driven at a 1.8432 MHz rate by power supply 930 whose operation is described with particularity in U.S. Pat. No. 4,802,080 issued Jan. 31, 1989.

Within the reader/writer unit 700, analog interface circuit 740 exchanges data with the smart card 500 under control of microprocessor 760. Capacitor plates 741-744 are aligned with the mating capacitor plates 541-544 within the smart card 500. The input/output serial data interface 750 is basically a universal asynchronous receiver transmitter (UART) which may be advantageously included in the microprocessor 760.

PROCESSING

Preload

Users protect their smart card as they protect their credit card, typically by carrying it in their wallet. Advantageously, once the card is removed from the transponder, the transponder is no longer operative for the payment of tolls. However, the smart card itself continues to be useful for the payment of other goods and services. Indeed, there is considerable marketing appeal for a card, issued by a regional transportation authority, that can be used for the payment of related highway services such as roadside telephones, restaurants, gasoline, and even speeding tickets.

As illustrated in FIG. 4, a motorist inserts smart card 500 into the transponder 600 sometime before having to make an electronic toll payment. Typically this occurs when he enters the vehicle if a toll booth is expected. Upon insertion of the card, the transponder delivers various messages. If the red light 622 turns on and a long buzz is heard, the card is not being inserted correctly. When it is correctly inserted, a double beep is heard and the transponder then indicates the money balance available on the card. The lights flash to indicate the balance available on the card to the nearest dollar. Every flash of green light 621 means $100, every flash of red light 622 means $10, and every flash of yellow light 623 means $1. If the motorist wishes to learn the balance while the card is in the transponder 600, he simply removes and reinserts it. When the balance falls below a certain dollar amount, the yellow light will begin flashing. The card should then be taken to the toll authority as soon as possible to credit more money into the card. The low balance amount is specified at the time of initialization and can be changed by the toll authority.

Data Exchange—Overview

Figure 8:
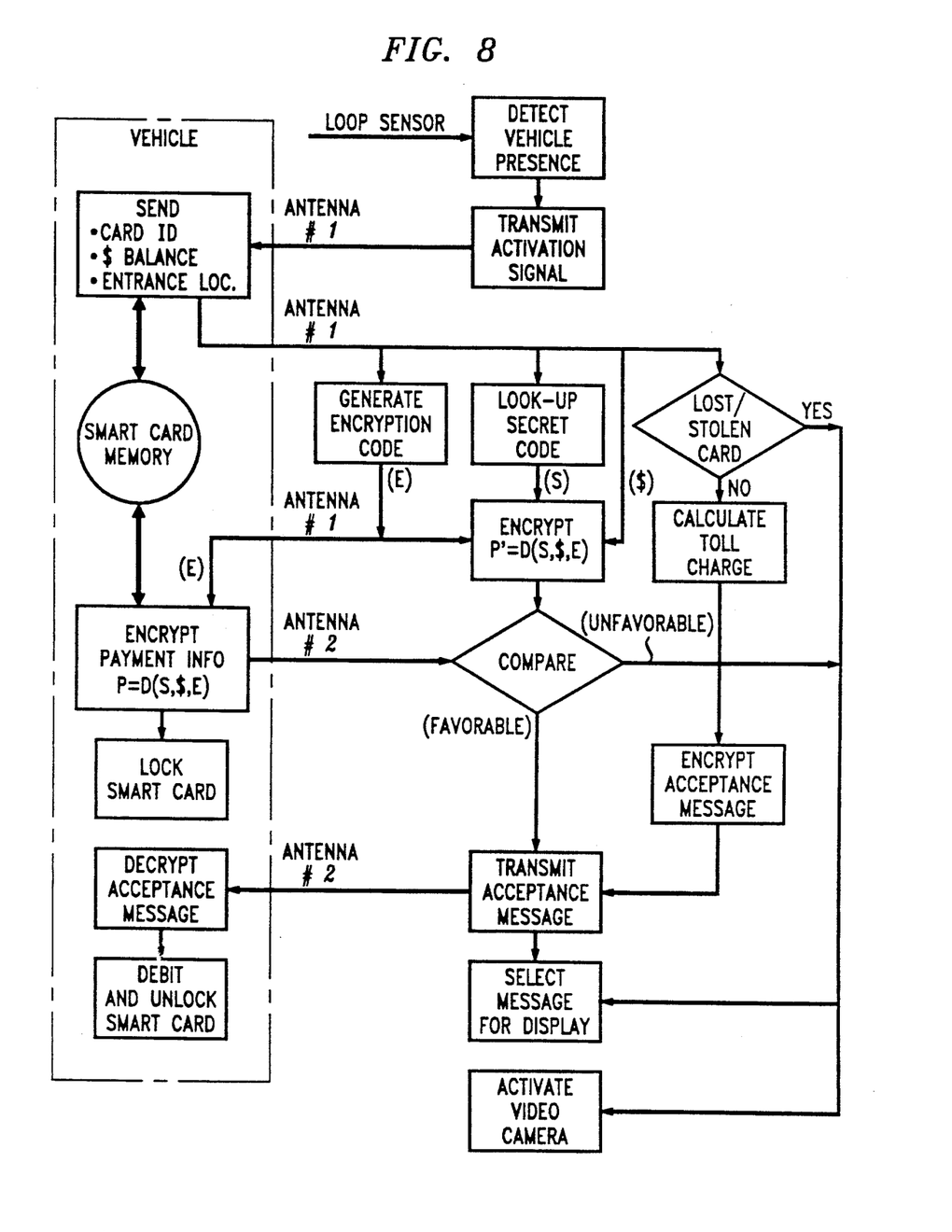
FIG. 8 is a flow diagram that illustrates the various steps performed in practicing the invention.

In accordance with the invention, FIG. 8 provides an overview of the data exchange between a moving vehicle and toll plaza equipment as the vehicle progresses through an express payment lane. It is assumed that the smart card remains positioned within the transponder during these data exchanges. Initially, a loop sensor provides a signal to the Lane Controller indicating that an oncoming vehicle is within the range of antenna 1. The Plaza Server then causes antenna 1 to transmit an activation signal to the transponder within the moving vehicle. In response to the activation signal, the transponder transmits data, comprising the data frames of FIG. 10 and 11, which have been preloaded into the microcontroller of the transponder from the smart card. For improved security, the smart card is locked at this time. (Locking means that the first byte of the file within the smart card that contains its ID number and vehicle class has hexadecimal character FF written into its first byte, and the card cannot be used for a new transaction until this character is removed). At the same time, the yellow light on the transponder is turned on to indicate that a transaction is pending.

Figure 14:
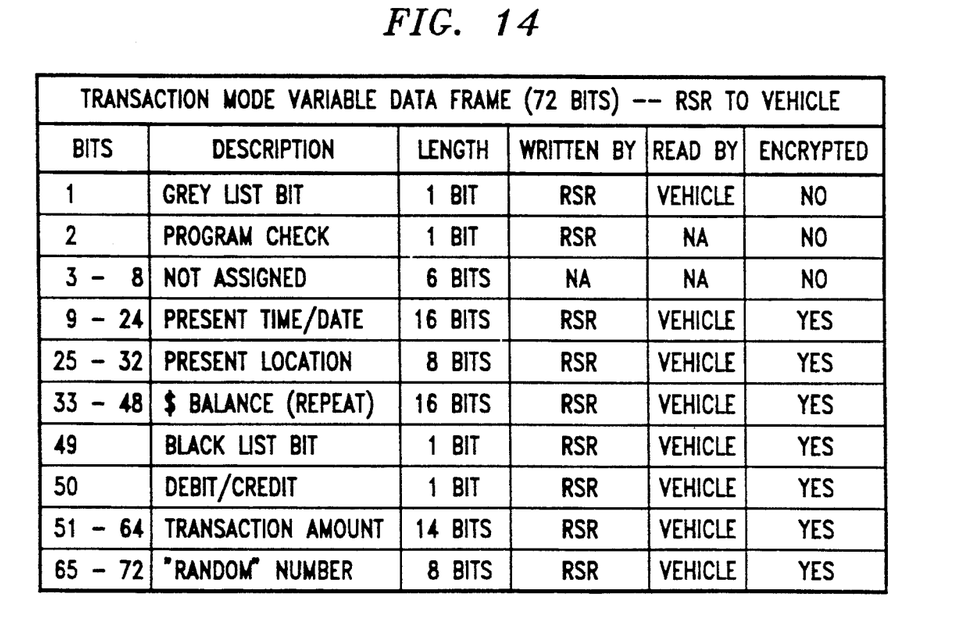
FIG. 14 discloses the format of the variable data frame portion of the transponder data frame transmitted by the RSR to the vehicle from antenna 2, this information is also referred to as the encrypted acceptance message.

When this data is received, the Plaza Server generates an encryption code which includes an 8-bit random number plus an indication of the time-of-day and day-of-year. This information is packed into a 128-bit transponder data frame, comprising the fixed data frame of FIG. 10 and the variable data frame of FIG. 12, and transmitted to the moving vehicle via antenna 1. At the same time the Server either uses the Card ID number to look up its secret code, or it generates the secret code (K) using the Card ID number and a secret algorithm. The secret code, the encryption code, and the money balance of the smart card (when it is used as a debit card) are combined and processed using the DES algorithm to generate an encrypted number (P') to be compared with an encrypted number (P) generated by the smart card. DES encryption processing occurs during the 500 millisecond interval allocated for transit between antenna 1 and antenna 2. (A brief time interval is required by the present generation smart card, for exchanging and processing data. This time interval is such that a vehicle will have moved too far, at maximum speed, to be served by a single antenna.) At the same time still, the Server searches to determine whether the Card ID is among its list of lost or stolen cards. If it is not, then toll charges are calculated. In some situations the toll is a fixed amount, and in other situations the toll depends on the location where the moving vehicle enters a limited-access highway. Each toll plaza is programmed to write its location into the smart card along with the time-of-day that a smart card-equipped vehicle passes through. Thus, whenever the vehicle arrives at the next toll plaza, toll charges can be properly calculated. Using this data, an acceptance message (such as indicated in FIG. 14) is encrypted for transmission to the moving vehicle. Note that this information includes the location of the present toll plaza, the present time-of-day, a black list bit, and the amount to be debited from the card. In the situation where a credit card (rather than a debit card) is used, the transaction amount is stored and used only as a record.

Antenna 2 transmits the encrypted acceptance message to the transponder of the moving vehicle where this data is decrypted and used to debit the card. Additionally, the smart card is unlocked based on information in the decrypted message. If, for example, the black list bit indicates that this is a stolen smart card, it will remain locked. Similarly, if the smart card is removed from the transponder between antenna 1 and antenna 2 in an attempt to avoid debit charges, the card will remain locked. A successful transaction concludes with an audible sound indicating same and the yellow light on the transponder is turned off to indicate that the transaction is complete.

The motorist is notified of successful and unsuccessful transactions by the message display at the toll plaza. An unsuccessful transaction would result when the amount of money in the debit card is inadequate, the card is lost or stolen, the card is removed from the transponder before it completes its transmission to antenna 2, error in data processing, or some other irregularity worthy of attention. In these situations, the motorist is instructed to pull over to a particular toll booth, but if he does not comply the video camera is activated to record the identity of the vehicle.

Figure 9:
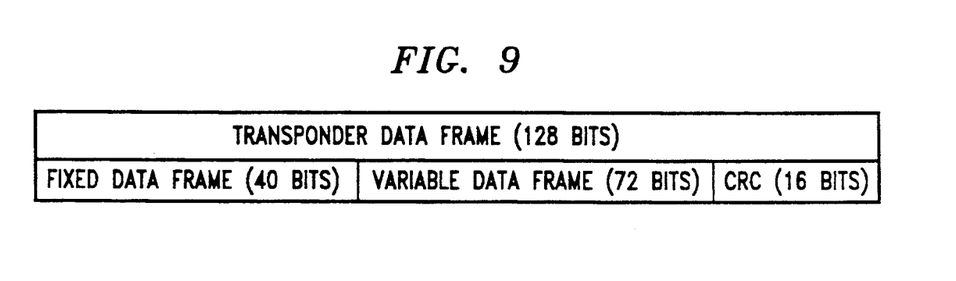
FIG. 9 discloses the format of a 128-bit transponder data frame comprising fixed and variable data frames.
Figure 10:
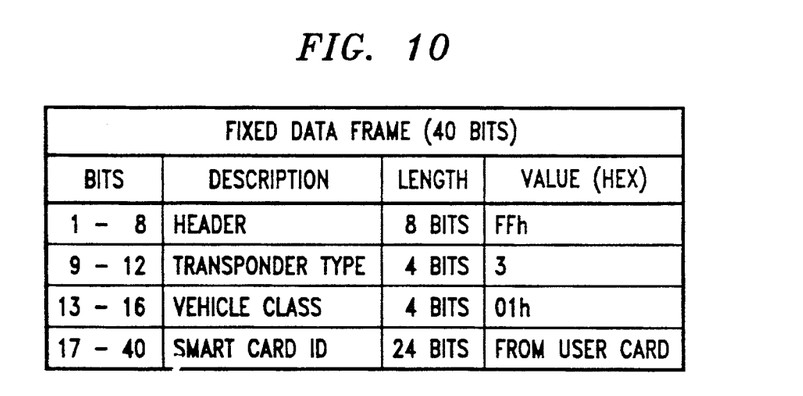
FIG. 10 discloses the format of the fixed data frame portion of the transponder data frame.
Figure 11:
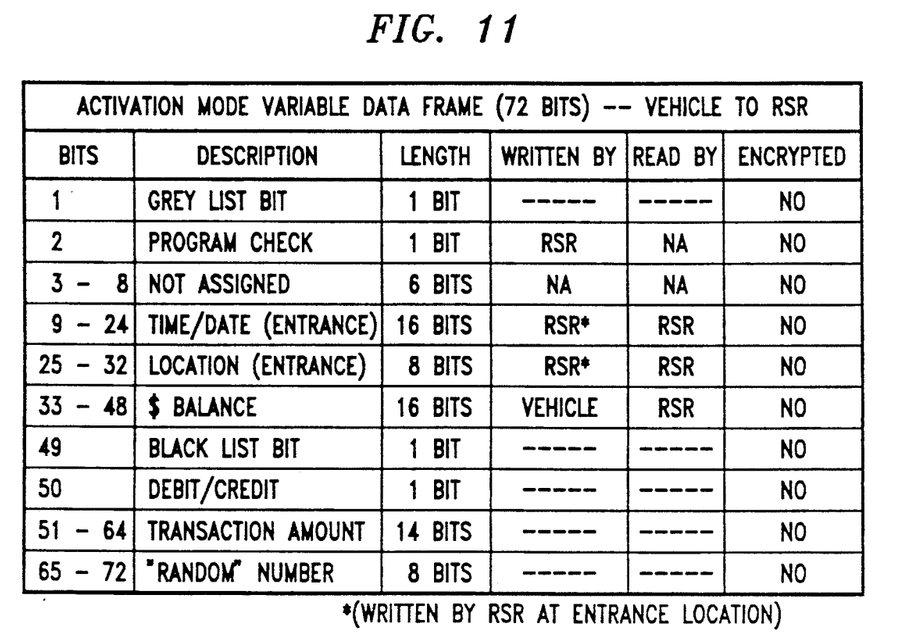
FIG. 11 discloses the format of the variable data frame portion of the transponder data frame, transmitted by the vehicle to antenna 1 of the Roadside Reader (RSR), immediately after an activation signal is received.

Information is exchanged between the transponder and the Server using the predetermined format shown in FIG. 9. This format is used by both the transponder and the RSR and comprises 128 bits. The transponder data frame includes fixed and variable portions plus a 16-bit cyclic redundancy code (CRC) used to verify the accuracy of transmission. The Fixed Data Frame is shown in FIG. 10 and contains information supplied by the smart card in the transponder of the vehicle. The first 16 bits of the fixed frame are the used to identify the type of transponder being used, the class of vehicle, and the identification of the particular smart card. Because improved transponder design is anticipated, it is necessary to identify the kind of transponder being used. Further, because different classes of vehicles pay different amounts of toll, it is necessary to identify vehicle class. Finally, the transmission of smart card ID enables use of a credit (rather than debit) card and provides improved security against theft and forgery. Indeed, the thrust of the present invention is to improve such security.

Data Exchange—Detailed

When the vehicle first enters the toll payment area, the Plaza Server stimulates the transponder—via an activation signal transmitted by antenna 1. Data are exchanged between the transponder and antenna 1 using a modulated 915 MHz carrier signal. In response to the activation signal, the transponder initiates a "wake up" call to the microprocessor in the smart card, and the transponder sends a 128-bit "transponder data frame" to antenna 1. The transponder data frame comprises a fixed frame of 40 bits (see FIG. 10), a variable frame of 72 bits (see FIG. 11), and an error-correcting code of 16 bits. At this time there is no encryption, and vehicle is not required. The secret code is known to the Plaza Server through a look-up table that associates the Card ID with the secret code. Alternatively, the Plaza Server can derive the secret code from the Card ID using a secret algorithm, and thereby avoid having to store the secret code for each smart card.

Figure 13:
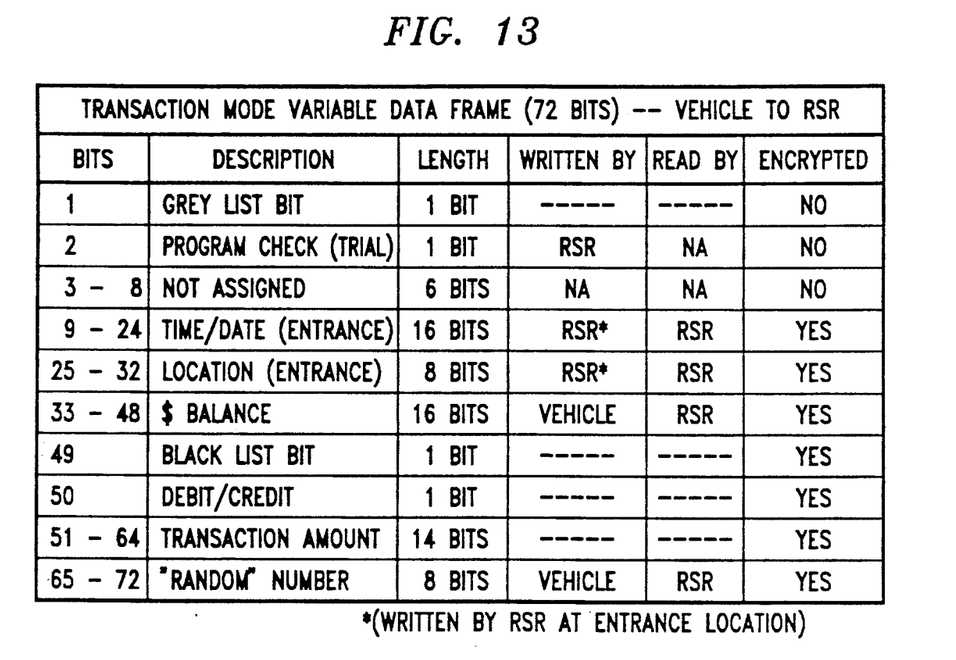
FIG. 13 discloses the format of the variable data frame portion of the transponder data frame transmitted by the vehicle to antenna 2 of the RSR.

Reference is now made to FIG. 13 which shows the variable data frame transmitted from the vehicle to antenna 2. Included in this data frame are bits 9-24 which is the time/date information just transmitted by antenna 1, bits 33-48 which represent the money balance remaining in the smart card when used as a debit card, and bits 65-72 which is the random number just transmitted by antenna 1. Bits 9-72 of the variable data frame correspond to message M and are encrypted by the microprocessor in the smart card according to the DES algorithm. The secret code stored in the memory of the smart card is used as the key K during DES encryption. Such encryption provides the advantage that if the entire transmission (vehicle to antenna 1 and vehicle to antenna 2) is recorded by electronic eavesdropping, it can only be fraudulently rebroadcast by another vehicle for the next ten minutes at most. In the preferred embodiment, however, the Plaza Server changes the random number for each new vehicle, and fraudulent rebroadcasting of intercepted information is virtually eliminated.

FIG. 14 discloses the variable data frame transmitted from antenna 2 to the vehicle which completes the transaction. As indicated above, the present location and time-of-day are transmitted for storage in the smart card memory. Such information is most useful when it identifies the entrance location of a limited access highway. Also transmitted is a repeat of the money balance of the card and the transaction amount to be debited. In the case where the smart card is a debit card, the transaction amount is used to decrease its money balance; and in the case where the smart card is a credit card, the transaction amount is merely stored as an electronic receipt. In either event, this message is known as the acceptance message and it includes a "Black List Bit" and a "Grey List Bit" which are used to keep the smart card locked when the Plaza Server determines that further use of the smart card is inappropriate. It is finally noted that this acceptance message is encrypted using the same encryption code (random number and time/date number) to enhance system security.

Although a particular embodiment has been shown and described, it is understood that various modifications can be made within the spirit and scope of the invention. These modifications include, but are not limited to, the use of encryption algorithms other than DES having greater or lesser security; building the smart card function into the transponder unit in a non-portable manner; the use of other identification, smart card identification and location information are transmitted in clear text. This information is used by the Plaza Server for toll calculation. The location information is generally written into the smart card by Servers located at highway entrances and read by Servers located at exits for the calculation of variable tolls.

Figure 12:
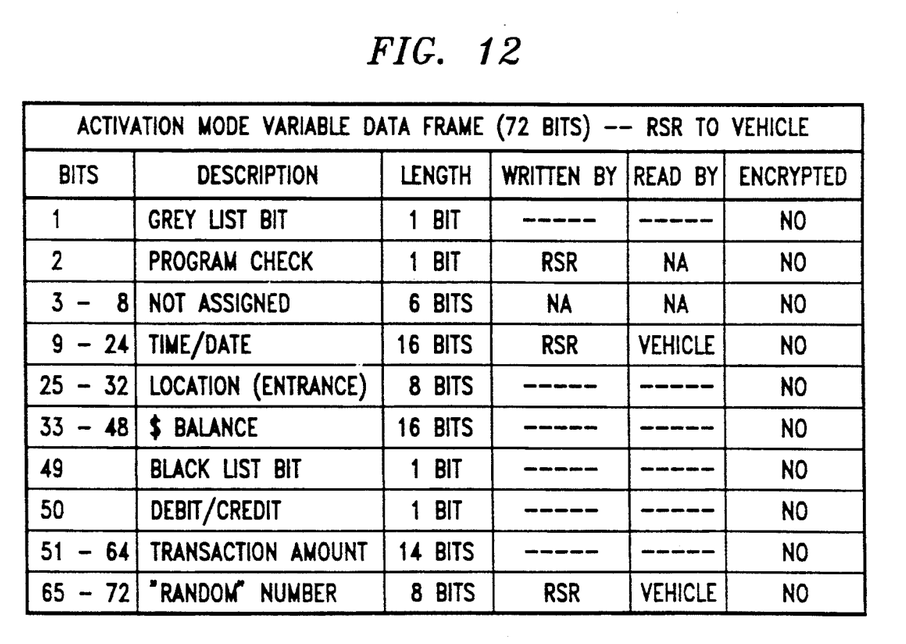
FIG. 12 discloses the format of the variable data frame portion of the transponder data frame transmitted by the RSR to the vehicle from antenna 1, this information is also referred to as the encryption code.

In response to the above transmission, the Server returns a similar transponder frame to the vehicle, however the variable data frame transmitted is now shown in FIG. 12 and includes a 16-bit time/date number and an 8-bit "random" number. In the preferred embodiment of the invention, they cooperate to form an encryption code. The time/date number represents the number of ten minute increments that have transpired since January 1 of the current year using Greenwich Mean Time. Further, the "random" number comprises eight bits which provide up to 256 different bit patterns that can be used to encode the data exchange between the transponder and the Server. The "random" number is periodically changed to foil scoundrels who would record such data exchanges and then replay them to avoid toll payments. The encryption code therefore comprises a predictable portion and a non-predictable portion where the predictable portions repeat yearly. What this means is that a different encryption code is guaranteed every ten minutes of the year, and that within the ten minute period, one of 256 possible codes will be operative. And although next year at the same time, a known portion (time/date number) of the encryption code will be repeated, there is only a small chance (1 in 256) that it will be the same as the previous year. Alternatively, bits 9-72 in FIG. 12 can all be randomly selected for even greater security.

The vehicle transponder now has all the necessary information to encrypt data for transmission to antenna 2. At this time, the smart card is locked to prevent the possibility of removal before it can be properly debited. If the card is otherwise acceptable, as determined by the Server, it is unlocked when antenna 2 completes the debit process. "Locking" means that the smart card cannot be used for any payment until it is returned to the card issuer and unlocked. Locking also takes place when the card is identified as being a lost or stolen card and a "finder" attempts to use it. Briefly, the significant information received from antenna 1 during the activation mode is the encryption code which, illustratively, includes the time/date number and the random number contained in the variable data frame.

Activation Processing

An encryption technique that has gained wide acceptance is the Data Encryption Standard (DES) and is intended for implementation in special purpose electronic devices. In 1977, the National Bureau of Standards (now NIST) issued DES as a Federal standard, and the National Security Agency has certified new products using the standard. While a relatively brief discussion of the application of DES to the invention is set forth below, a more comprehensive treatment is set forth in the Jan. 15, 1977 Federal Information Processing Standards Publication 46 (FIPS 46), entitled "Specifications for the Data Encryption Standard."

DES is a private-key scheme in which both encrypting and decrypting keys are identical and secret. DES operates on data in blocks of 64-bits, sending it through 16 stages of the algorithm before exiting as a 64-bit ciphertext. Encryption relies heavily on proper management of keys—the strings of characters that must be input to the algorithms before encryption or decryption can take place. The DES algorithm D encrypts a 64-bit message M into ciphertext C—a process that is mathematically stated by the equation $C=D(M)$. The output signal is available in 64-bit-wide binary form for delivery to the destination station.

DES proceeds by rearranging (permuting) a 64-bit message according to a known pattern in an operation akin to shuffling cards. The permuted block of 64-bits is now split into two blocks, each comprising 32-bits in an operation akin to cutting the cards. At this point, the card shuffling analogy fails because mathematical operations (modulo 2 addition) and cipher function (f) are introduced along with a key K. Values for $K_1 \ldots K_{16}$ are selected in accordance with 16 different predetermined schedules whereby each $K_n$ comprises an ordered set of 48-bits chosen from the 64-bit key. Cipher function (f) denotes an operation f(M, K) in which a portion (32 bits) of the message M is modulo-2 combined with a portion (48 bits) of the key K. certain predetermined bits are discarded from the resulting combination so that only 32 bits remain. Cipher function (f) is performed 16 times using different portions of M and K.

Transaction Processing

Although DES is used in the preferred embodiment of the invention, other encryption algorithms are possible. Applying DES to the present invention entails using the last 64 bits (bits 9-72) of the variable data frame (i.e., the encryption code) as the message M, and a 64-bit secret code as the key K. Note that a secret code is stored in the memory of each smart card. In the preferred embodiment of the invention, the secret code is different for each smart card although such uniqueness predictable or non-predictable numbers as the encryption code; the use of different data structures within the transponder data frame; and the use of a single antenna at the toll plaza to communicate with the moving vehicle.

We claim:

1. In a toll collecting system comprising a first transceiver which is located in a moving vehicle and a second transceiver which is located at a relatively fixed location on a roadway, a secure method for collecting tolls from the moving vehicle comprising the steps of:
    generating an encryption code at the second transceiver;
    transmitting the encryption code to the first transceiver;
    storing payment information and a predetermined encryption algorithm in the first transceiver;
    encrypting the payment information, using the encryption code, in accordance with the predetermined algorithm;
    transmitting the encrypted payment information to the second transceiver; and
    verifying the encrypted payment information at the second transceiver.

2. The method of claim 1 further including the steps of:
    encrypting an acceptance message at the second transceiver; and
    transmitting the encrypted acceptance message to the first transceiver.

3. The method of claim 1 wherein the first transceiver includes a removable debit card which stores a money balance available for making payments, the method further including the following steps that take place at the first transceiver;
    locking the debit card while data is being exchanged with the second transceiver; and
    unlocking the debit card in response to the encrypted acceptance message from the second transceiver.

4. The method of claim 1 wherein the encryption code includes a sequence of digits which changes in an unpredictable manner.

5. The method of claim 1 wherein the encryption code comprises a sequence of digits which changes in a predictable manner.

6. The method of claim 5 wherein the sequence of digits comprises an indication of the time-of-day and/or day-of-year.

7. The method of claim 1 wherein the encryption code comprises a first sequence of digits which changes in a random manner, and a second sequence of digits which changes in a non-random manner.

8. The method of claim 1 wherein the predetermined encryption algorithm comprises the Data Encryption Standard.

9. The method of claim 1 wherein the second transceiver comprises a pair of spaced-apart antennas and a computer for controlling same, said antennas being sequentially positioned along a payment lane of the roadway.

10. The method of claim 1 wherein the first transceiver comprises a transponder unit and a smart card which is inserted therein; the smart card storing the payment information and the encryption algorithm.

11. The method of claim 10 wherein the payment information includes a secret code that is associated with the smart card and is known to the second transceiver.

12. The method of claim 11 wherein the payment information further includes a money balance which is reduced by making toll payments.

13. In a toll collecting system comprising a first transceiver which is located in a moving vehicle and a second transceiver which is located at a relatively fixed location on a roadway, a secure method for collecting tolls from the moving vehicle comprising the steps of:
    generating an encryption code at the second transceiver;
    transmitting the encryption code to the first transceiver;

storing a predetermined algorithm in the first transceiver;

encrypting the encryption code in accordance with the predetermined algorithm;

transmitting the encrypted encryption code to the second transceiver; and verifying the encrypted encryption code at the second transceiver.

14. The method of claim 13 wherein the encryption code comprises a sequence of digits which changes in an unpredictable manner.

15. The method of claim 13 wherein the encryption code comprises a sequence of digits which changes in a predictable manner.

16. In a system for making payments to payment collecting apparatus from a distance in a secure manner, the combination of a transponder unit and a smart card the transponder unit comprising:

means for receiving and demodulating a first radio frequency (RF) signal to recover an encryption code transmitted by the payment collecting apparatus;

means for delivering the encryption code to the smart card;

means for receiving an encrypted encryption code from the smart card;

means responsive to the encrypted encryption code for generating and transmitting a second RF signal to the payment collecting apparatus;

the smart card comprising:

means for receiving the encryption code from the transponder unit;

means storing a predetermined algorithm and a secret code associated with the smart card;

means responsive to the secret code for encrypting the encryption code in accordance with the predetermined algorithm; and means for delivering the encrypted encryption code to the transponder unit.

17. The system of claim 16 wherein the smart card is a debit card which further includes means for decreasing a money balance stored in the card in response to a third RF signal that is transmitted by the payment collecting apparatus and received by the transponder unit.

18. The system of claim 16 wherein the predetermined algorithm comprises the Data Encryption Standard.

19. A secure toll collection system for moving vehicles including roadside communication apparatus and vehicle-mounted apparatus for transmitting/receiving radio frequency signals to/from each other, the roadside communication apparatus comprising:

a first antenna for transmitting an encryption code to the moving vehicle;

a second antenna, spaced apart from the first antenna, for receiving encrypted payment information from the moving vehicle;

data processing means, communicatively connected to the first and second spaced-apart antennas, for periodically changing the encryption code and for verifying the authenticity of the encrypted payment information, the vehicle-mounted apparatus comprising:

means for storing payment information, a secret code, and a predetermined algorithm;

means for encrypting the payment information in accordance with the predetermined algorithm and the encryption code; and means for transmitting the encrypted payment information to the second antenna.

20. The secure toll collecting system of claim 19 wherein the vehicle-mounted apparatus comprises a transponder unit and a smart card.

* * * * *